(12) United States Patent
Han-Adebekun et al.

(10) Patent No.: US 8,183,319 B2
(45) Date of Patent: May 22, 2012

(54) FILM FORMING ADDITIVE FORMULATIONS OF CONDUCTIVE POLYMERS

(75) Inventors: Gang Chris Han-Adebekun, Center Valley, PA (US); Thomas John Markley, Blandon, PA (US); Michael Scott Lowry, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 500 days.

(21) Appl. No.: 12/248,098

(22) Filed: Oct. 9, 2008

(65) Prior Publication Data

US 2009/0107543 A1 Apr. 30, 2009

Related U.S. Application Data

(60) Provisional application No. 60/984,102, filed on Oct. 31, 2007.

(51) Int. Cl.
*C08L 27/18* (2006.01)

(52) U.S. Cl. ........ 524/545; 524/500; 524/501; 524/520; 524/609; 524/817; 525/535; 136/263; 313/507

(58) Field of Classification Search ............... 525/535, 525/540; 136/263; 313/507; 252/500; 524/500, 524/501, 520, 545, 609, 817
See application file for complete search history.

(56) References Cited

U.S. PATENT DOCUMENTS

| 3,282,875 | A | 11/1966 | Connolly et al. |
| 4,156,616 | A | 5/1979 | Dietz et al. |
| 4,358,545 | A | 11/1982 | Ezzell et al. |
| 4,940,525 | A | 7/1990 | Ezzell et al. |
| 5,300,575 | A | 4/1994 | Jonas et al. |
| 5,324,349 | A | 6/1994 | Shimizu et al. |
| 7,040,945 | B2 | 5/2006 | Yabe |
| 7,067,841 | B2 | 6/2006 | Parker |
| 7,250,461 | B2 * | 7/2007 | Hsu et al. ............... 524/445 |
| 2004/0121210 | A1 | 6/2004 | Hamrock et al. |
| 2004/0254297 | A1 * | 12/2004 | Hsu et al. ............... 525/54.2 |
| 2005/0037265 | A1 | 2/2005 | Watakabe |
| 2005/0067949 | A1 | 3/2005 | Natarajan et al. |
| 2005/0151122 | A1 | 7/2005 | Jiang et al. |
| 2005/0209388 | A1 * | 9/2005 | Hsu et al. ............... 524/457 |
| 2005/0224765 | A1 | 10/2005 | Hsu et al. |
| 2006/0076557 | A1 * | 4/2006 | Waller et al. ............... 257/40 |
| 2006/0159842 | A1 | 7/2006 | Gupta et al. |
| 2006/0241279 | A1 * | 10/2006 | Sotzing et al. ............... 528/373 |
| 2007/0085061 | A1 | 4/2007 | Elder et al. |

FOREIGN PATENT DOCUMENTS

| EP | 0 999 242 | A1 | 5/2000 |
| EP | 1 647 566 | A2 | 4/2006 |
| EP | 1 652 850 | A1 | 5/2006 |
| EP | 1 728 810 | A1 | 12/2006 |
| JP | 2006-527277 | A | 11/2006 |
| WO | 2004/094501 | A2 | 11/2004 |
| WO | WO 2004/094501 | * | 11/2004 |
| WO | 2005/090434 | A1 | 9/2005 |
| WO | 2005/090436 | A1 | 9/2005 |
| WO | 2006123167 | | 11/2006 |
| WO | 2008/082622 | A1 | 7/2008 |

OTHER PUBLICATIONS

Wu, C.C. et al; "Integration of Organic LED's and Amorphous Si TFT's onto Flexible and Lightweight Metal Foil Substrates;" IEEE Electron Device Letter, vol. 18, No. 12 (1997); p. 609-612.

Jiang et al; "Enhanced Lifetime of Polymer Light-Emitting Diodes Using Poly(thieno(3,4-b) thiophene) Based Conductive Polymers;" Proc. of SPIE, vol. 6333 633304-1; (2006) p.

* cited by examiner

*Primary Examiner* — Ling Choi

(74) *Attorney, Agent, or Firm* — Michael K. Boyer

(57) ABSTRACT

An aqueous dispersion including a partially fluorinated dispersant, an electrically conductive polymer and a film forming additive. The film forming additive includes a boiling temperature greater than about 85° C. (185° F.). In addition, the concentration of the film forming additive is less than the solubility limit of the additive in water. The dynamic surface tension of the dispersion including the film forming additive is less than about 60 dynes/cm at 100 ms surface age. A method for making an electrically conductive polymer film and devices including electrically conductive polymer film are also disclosed.

26 Claims, 1 Drawing Sheet

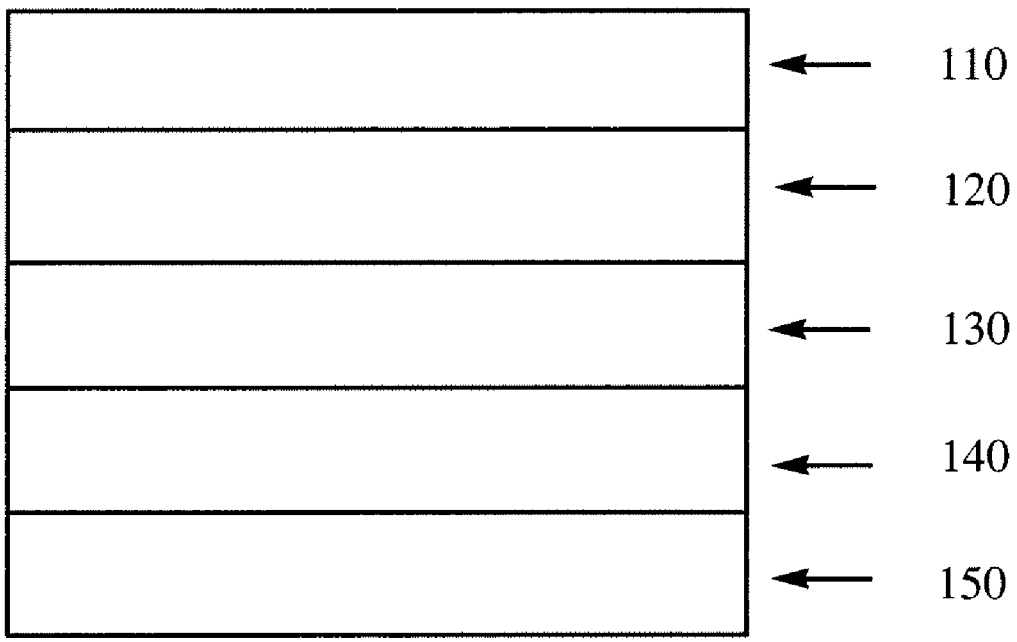

FILM FORMING ADDITIVE FORMULATIONS OF CONDUCTIVE POLYMERS

CROSS-REFERENCE TO RELATED APPLICATIONS

This Application claims benefit of Provisional Application No. 60/984,102, filed Oct. 31, 2007. The disclosure of the Provisional Application is hereby incorporated by reference in its entirety.

BACKGROUND OF THE INVENTION

The present invention is directed to conductive polymer materials, the method of making polymeric material and applications utilizing conductive polymer materials.

Electrically conducting polymers have been used in a variety of organic electronic devices, including in the development of electroluminescent (EL) devices for use in light emissive displays. With respect to EL devices, such as organic light emitting diodes (OLEDs) containing conducting polymers, such devices generally have the following configuration:

anode/hole injection layer/EL layer/cathode

The anode is typically any material that has the ability to inject holes into the otherwise filled π-band of the semiconducting material used in the EL layer, such as, for example, indium/tin oxide (ITO). The anode is optionally supported on a glass or plastic substrate. The EL layer is typically semiconducting, conjugated organic material, including a conjugated semiconducting polymer such as poly(paraphenylenevinylene), polyfluorene, spiropolyfluorene or other EL polymer material, a small molecule fluorescent dye such as 8-hydroxyquinoline aluminum ($Alq_3$), a small molecule phosphorescent dye such as fac tris(2-phenylpyridine) Iridium (III), a dendrimer, a conjugated polymer grafted with phosphorescent dye, a blend that contains the above-mentioned materials, and combinations. The EL layer can also be inorganic quantum dots or blends of semiconducting organic material with inorganic quantum dots. The cathode is typically any material (such as, e.g., Ca or Ba) that has the ability to inject electrons into the otherwise empty π*-band of the semiconducting organic material in the EL layer.

The hole injection layer (HIL) is typically a conducting polymer and facilitates the injection of holes from the anode into the semiconducting organic material in the EL layer. The hole injection layer can also be called a hole transport layer, hole injection/transport layer, or anode buffer layer, or may be characterized as part of a bilayer anode. Typical conducting polymers employed as hole injection layer include polyaniline and polydioxythiophenes such as poly(3,4-ethylenedioxythiophene) (PEDOT). These materials can be prepared by polymerizing aniline or dioxythiophene monomers in aqueous solution in the presence of a water soluble polymeric acid, such as poly(styrenesulfonic acid) (PSSA), as described in, for example, U.S. Pat. No. 5,300,575 entitled "Polythiophene dispersions, their production and their use"; hereby incorporated by reference in its entirety. A well known PEDOT/PSSA material is Baytron®-P, commercially available from H. C. Starck, GmbH (Leverkusen, Germany).

Electrically conducting polymers have also been used in photovoltaic devices, which convert radiation energy into electrical energy. Such devices generally have the following configuration:

positive electrode/hole extraction layer/light harvesting layer(s)/negative electrode The positive electrode and negative electrode can be selected from materials used for the anode and cathode of EL devices mentioned above. The hole extraction layer is typically a conducting polymer that facilitates the extraction of holes from the light harvesting layers for collection at the positive electrode. The light harvesting layer or layers typically consists of organic or inorganic semiconductors that can absorb light radiation and generate separated charges at an interface.

Electrically conducting polymers also have utility as electrodes for electronic devices, such as thin film field effect transistors. In such transistors, an organic semiconducting film is present between source and drain electrodes. To be useful for the electrode application, the conducting polymers and the liquids for dispersing or dissolving the conducting polymers have to be compatible with the semiconducting polymers and the solvents for the semiconducting polymers to avoid re-dissolution of either conducting polymers or semi-conducting polymers. The electrical conductivity of the electrodes fabricated from the conducting polymers should be greater than 10 S/cm (where S is a reciprocal ohm). However, the electrically conducting polythiophenes made with a polymeric acid typically provide conductivity in the range of about $10^{-3}$ S/cm or lower. In order to enhance conductivity, conductive additives may be added to the polymer. However, the presence of such additives can deleteriously affect the processability of the electrically conducting polythiophene.

Attempts have been made to improve the properties of conductive polymer films. For example, U.S. Pat. No. 7,250,461 B2, which is hereby incorporated by reference in its entirety, discloses the addition of organic solvent in conductive polymers made with fluorinated polymeric acid colloids in order to increase the film conductivities. However, the solvents used in this disclosure fail to improve the surface tension of the formulated dispersion, leading to poor wetting property during deposition on substrate.

In addition, WO 2006/123167A1 (the WO 167 disclosure), which is hereby incorporated by reference in its entirety, discloses an ink jet ink formulation with poly(3,4-ethylenedioxythiophene)/polystyrene sulfonic acid (PEDOT/PSSA) dispersion where polyols were used as humectant together with small amount of glycol ether as surfactant. A drawback of the formulation of the WO 167 disclosure is that the use of colloid-forming dispersant PSSA, which is not at least a partially fluorinated dispersant, the conductive polymer layer formed on the substrate undesirably can adsorb moisture from the environment. This may lead to layer delamination and ultimately poor device life time.

Earlier study by Jiang et al (SPIE 2006 proceeding) titled "Enhanced Lifetime of Polymer Light-Emitting Diodes Using Poly(thieno[3,4-b]thiophene) base Conductive Polymers" concluded that conducting polymer with the colloid-forming polymeric acid comprises a highly-fluorinated sulfonic acid polymer ("FSA polymer") has better thermal stability and low moisture residue as compared to conducting polymer with the water soluble colloid-forming polymeric acid such as poly(styrene sulfonic acid) (PSSA). This may well be one of the key factors leading to longer device lifetime, especially under high temperature and high humidity conditions.

However, conductive polymer dispersion comprising the highly-fluorinated sulfonic acid polymer as dispersing polymer alone, such as NAFION®, introduces the following two major processing deficiencies: a) hydrophobic nature of the dispersion causes poor wetting on substrate (e.g. ITO/glass, ITO/PET) and often poor adhesion to adjacent layer such as LEP layer. b) The highly-fluorinated sulfonic acid polymer is dispersible in water with limited solubility in water. As a result, the polymer dispersion utilizing only a highly-fluorinated sulfonic acid polymer has relatively low bulk viscosity. This limits the processing operating choices during the film deposition step.

What is needed is a conductive polymer and device formed from conductive polymers that are easily processed, produces high quality conductive films suitable for use in electronic components, and do not suffer from the drawbacks of the prior art.

The previously identified patents and patent applications are hereby incorporated by reference.

BRIEF SUMMARY OF THE INVENTION

The instant invention solves problems associated with conventional materials by providing conductive polymer compositions (e.g., a dispersion), that have improved processability and can provide quality conductive films that can be employed, for example, in electronic components.

Conductive polymers comprising at least partially fluorinated dispersants show device performance advantages for a wide range of electronics applications such as hole injection layer for light emitting diode and photovoltaic devices. In order to improve the material processibility during the deposition stage, a film forming additive is added to the conductive polymer dispersion. The inclusion of the film forming additive allows film thickness control, improved wetting on substrates and wider compatibility with deposition methods.

One aspect of the present disclosure includes an aqueous dispersion including a partially fluorinated dispersant, an electrically conductive polymer and a film forming additive. The film forming additive includes a boiling temperature greater than about 85° C. (185° F.). In addition, the concentration of the film forming additive is less than the solubility limit of the additive in water. The dynamic surface tension of the dispersion including the film forming additive is less than about 60 dynes/cm at 100 ms surface age.

Another aspect of the present disclosure includes a method for forming a conductive polymer film. The method includes providing a substrate, and providing a polymer dispersion. The polymer dispersion includes an aqueous dispersion including a partially fluorinated dispersant, an electrically conductive polymer and a film forming additive. The film forming additive includes a boiling temperature greater than about 85° C. (185° F.). In addition, the concentration of the film forming additive is less than the solubility limit of the additive in water. The dynamic surface tension of the dispersion including the film forming additive is less than about 60 dynes/cm at 100 ms surface age. The method further includes drying the dispersion to form a conductive polymer film.

Still another aspect of the present disclosure includes a device comprising a conductive polymeric film. The conductive film has an electrical conductivity of 10E-6 to 300 S/cm. The film having been formed from a dispersion comprising a partially fluorinated dispersant, an electrically conductive polymer and a film forming additive. The film forming additive includes a boiling temperature greater than about 85° C. (185° F.). In addition, the concentration of the film forming additive is less than the solubility limit of the additive in water. The dynamic surface tension of the dispersion including the film forming additive is less than about 60 dynes/cm at 100 ms surface age.

Other features and advantages of the present invention will be apparent from the following more detailed description of the certain aspects or embodiments, taken in conjunction with the accompanying drawings which illustrate, by way of example, the principles of the invention.

BRIEF DESCRIPTION OF SEVERAL VIEWS OF THE DRAWINGS

FIG. 1 illustrates an elevational cross-sectional view of an electronic device that includes a hole injection layer according to an embodiment of the present disclosure.

DETAILED DESCRIPTION OF THE INVENTION

The present disclosure relates to aqueous dispersions of electrically conductive polymers, methods for applying such dispersions, and devices incorporating conductive polymer containing films. The inventive conductive polymer dispersions may comprise heterocyclic fused ring monomer units, such as, but not limited to, polythienothiophenes, including, poly(thieno[3,4-b]thiophenes). The disperson also includes an at least partially fluorinated polymer. As used herein, the term "dispersion" refers to a liquid medium comprising a suspension of minute colloid particles. In accordance with the invention, the "liquid medium" is typically an aqueous liquid, e.g., de-ionized water. As used herein, the term "aqueous" refers to a liquid that has a significant portion of water and in one embodiment it is at least about 40% by weight water. As used herein, the term "colloid" refers to the minute particles suspended in the liquid medium, said particles having a particle size up to about 1 micron (e.g., about 20 nanometers to about 800 nanometers and normally about 30 to about 500 nanometers).

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

The electrically conductive polymer may include polymerized units of heterocyclic fused ring monomer units. The conductive polymer can be a polyaniline, polypyrroles or polythiophene and their derivatives or combinations thereof.

Polypyrroles contemplated for use the new composition have Formula I

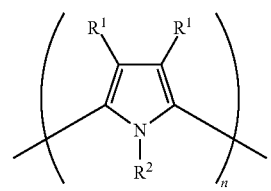

where in Formula I, n is at least about 4; $R^1$ is independently selected so as to be the same or different at each occurrence and is selected from hydrogen, alkyl, alkenyl, alkoxy, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, amidosulfonate, benzyl, carboxylate, ether, ether carboxylate, ether sulfonate, and urethane; or both $R^1$ groups together may form an alkylene or alkenylene chain completing a 3, 4, 5, 6, or 7-membered aromatic or alicyclic ring, which ring may optionally include one or more divalent nitrogen, sulfur or oxygen atoms; and $R^2$ is independently selected so as to be the same or different at each occurrence and is selected from hydrogen, alkyl, alkenyl, aryl, alkanoyl, alkylthioalkyl, alkylaryl, arylalkyl, amino, epoxy, silane, siloxane, alcohol, amidosulfonate, benzyl, carboxylate, ether, ether carboxylate, ether sulfonate, sulfonate, and urethane.

In one embodiment, $R^1$ is the same or different at each occurrence and is independently selected from hydrogen, alkyl, alkenyl, alkoxy, cycloalkyl, cycloalkenyl, alcohol, amidosulfonate, benzyl, carboxylate, ether, ether carboxylate, ether sulfonate, sulfonate, urethane, epoxy, silane, siloxane, and alkyl substituted with one or more of sulfonic acid, carboxylic acid, acrylic acid, phosphoric acid, phosphonic acid, halogen, nitro, cyano, hydroxyl, epoxy, silane, or siloxane moieties.

In one embodiment, $R^2$ is selected from hydrogen, alkyl, and alkyl substituted with one or more of sulfonic acid, carboxylic acid, acrylic acid, phosphoric acid, phosphonic acid, halogen, cyano, hydroxyl, epoxy, silane, or siloxane moieties.

In one embodiment, the polypyrrole is unsubstituted and both $R^1$ and $R^2$ are hydrogen.

In one embodiment, both $R^1$ together form a 6-or 7-membered alicyclic ring, which is further substituted with a group selected from alkyl, heteroalkyl, alcohol, amidosulfonate, benzyl, carboxylate, ether, ether carboxylate, ether sulfonate, sulfonate, and urethane. These groups can improve the solubility of the monomer and the resulting polymer. In one embodiment, both $R^1$ together form a 6-or 7-membered alicyclic ring, which is further substituted with an alkyl group. In one embodiment, both $R^1$ together form a 6-or 7-membered alicyclic ring, which is further substituted with an alkyl group having at least 1 carbon atom.

In one embodiment, both $R^1$ together form $—O—(CHY)_m—O—$, where m is 2 or 3, and Y is the same or different at each occurrence and is selected from hydrogen, alkyl, alcohol, amidosulfonate, benzyl, carboxylate, ether, ether carboxylate, ether sulfonate, sulfonate, and urethane. In one embodiment, at least one Y group is not hydrogen. In one embodiment, at least one Y group is a substituent having F substituted for at least one hydrogen. In one embodiment, at least one Y group is perfluorinated.

In one embodiment, the polypyrrole used in the new composition is a positively charged conductive polymer where the positive charges are balanced by the colloidal polymeric acid anions.

Polythiophenes contemplated for use in the new composition have Formula II below:

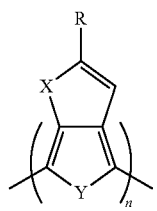

wherein: $R^1$ is independently selected so as to be the same or different at each occurrence and is selected from hydrogen, alkyl, alkenyl, alkoxy, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, amidosulfonate, benzyl, carboxylate, ether, ether carboxylate, ether sulfonate, and urethane; or both $R^1$ groups together may form an alkylene or alkenylene chain completing a 3, 4, 5, 6, or 7-membered aromatic or alicyclic ring, which ring may optionally include one or more divalent nitrogen, sulfur or oxygen atoms, and n is at least about 4.

In one embodiment, both $R^1$ together form $—O—(CHY)_m—O—$, where m is 2 or 3, and Y is the same or different at each occurrence and is selected from hydrogen, alkyl, alcohol, amidosulfonate, benzyl, carboxylate, ether, ether carboxylate, ether sulfonate, sulfonate, and urethane. In one embodiment, all Y are hydrogen. In one embodiment, the polythiophene is poly(3,4-ethylenedioxythiophene). In one embodiment, at least one Y group is not hydrogen. In one embodiment, at least one Y group is a substituent having F substituted for at least one hydrogen. In one embodiment, at least one Y group is perfluorinated.

In one embodiment, the polythiophene is a poly[(sulfonic acid-propylene-ether-methylene-3,4-dioxyethylene) thiophene]. In one embodiment, the polythiophene is a poly[(propyl-ether-ethylene-3,4-dioxyethylene)thiophene].

In one embodiment of the present invention, the invention provides monomeric, oligomeric and polymeric compositions having repeating unit having formula P1, as follows:

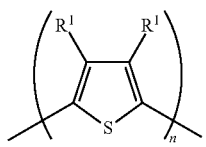

P1 wherein X is S or Se, Y is S or Se, R is a substituent group. n is greater than about 2 and less than 20 and normally about 4 to about 16. R may be any substituent group capable of bonding to the ring structure of P1. R may include hydrogen or isotopes thereof, hydroxyl, alkyl, including $C_1$ to $C_{20}$ primary, secondary or tertiary alkyl groups, arylalkyl, alkenyl, perfluoroalkyl, perfluororaryl, aryl, alkoxy, cycloalkyl, cycloalkenyl, alkanoyl, alkylthio, aryloxy, alkylthioalkyl, alkynyl, alkylaryl, arylalkyl, amido, alkylsulfinyl, alkoxyalkyl, alkylsulfonyl, aryl, arylamino, diarylamino, alkylamino, dialkylamino, arylarylamino, arylthio, heteroaryl, arylsulfinyl, alkoxycarbonyl, arylsulfonyl, carboxyl, halogen, nitro, cyano, sulfonic acid, or alkyl or phenyl substituted with one or more sulfonic acid (or derivatives thereof), phosphoric acid (or derivatives thereof), carboxylic acid (or derivatives thereof), halo, amino, nitro, hydroxyl, cyano or epoxy moieties. In certain embodiments R may include alpha reactive sites, wherein branched oligomeric, polymeric or copolymeric structures of the selenium containing ring structure may be formed. In certain embodiments, R may include hydrogen, alkylaryl, arylalkyl, aryl, heteroaryl, $C_1$ to $C_{12}$ primary, secondary or tertiary alkyl groups, which may be mono- or polysubstituted by F, Cl, Br, I or CN, and wherein one or more non-adjacent $CH_2$ groups may be replaced, independently with $—O—$, $—S—$, $—NH—$, $—N'—$, $—SiR'R''—$, $—CO—$, $—COO—$, $—OCO—$, $—OCO—O—$, $—S—CO—$, $—CO—S—$, $—CH=CH—$ or $—C\equiv C—$ in such a manner that O and/or S atoms are not linked directly to one another, phenyl and substituted phenyl groups, cyclohexyl, naphthalenic, hydroxyl, alkyl ether, perfluoroalkyl, perfluoroaryl, carboxylic acids, esters and sulfonic acid groups, perfluoro, $SF_5$, or F. R' and R'' are independently of each other H, aryl or alkyl with 1 to 12 C-atoms. The polymer can include end-groups independently selected from functional or non-functional end-groups. The repeating structures according to the present invention may be substantially identical, forming a homopolymer, or may be copolymeric nature by selecting monomers suitable for copolymerization. The repeating unit may be terminated in any suitable manner known in the art and may include functional or non-functional end groups. In addition, dispersions and solutions containing P1 and polymeric acid doped compositions of P1. In one embodiment, the composition includes an aqueous dispersion of a polymeric acid doped polymer according to P1.

In one aspect of the disclosure, aqueous dispersions comprising electrically conductive polythienothiophenes such as poly(thieno[3,4-b]thiophene) can be prepared when thienothiophene monomers including thieno[3,4-b] thiophene monomers, are polymerized chemically in the presence of at least one partially fluorinated polymeric acid. The dispersion of polythienothiophene according to the present disclosure includes a film forming additive. The film forming additive has a boiling point of les than about 85O (and provides a dynamic surface tension of 100 milliseconds (ms) of less than 60°/cm. The total concentration of the film forming additive is less than the solubility limit of the additive in water.

Compositions according to one embodiment of the invention comprise a continuous aqueous phase in which the poly (thieno[3,4-b]thiophene) and dispersion-forming partially fluorinated polymeric acid are dispersed. Poly(thieno[3,4-b] thiophenes) that can be used in the present invention can have the structure (1) and (2):

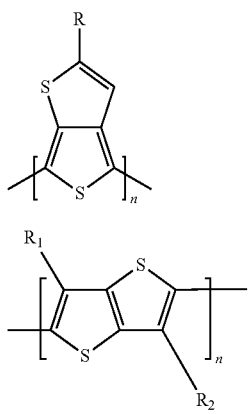

wherein R is selected from hydrogen, an alkyl having 1 to 8 carbon atoms, phenyl, substituted phenyl, $C_mF_{2m+1}$, F, Cl, and $SF_5$, and n is greater than about 2 and less than 20 and normally about 4 to about 16.

Thienothiophenes that can be used in the compositions of this invention may also have the structure (2) as provided above, wherein $R_1$ and $R_2$ are independently selected from the list above. In one particular embodiment, the polythienothiophene comprises poly(thieno[3,4-b]thiophene) wherein R comprises hydrogen.

Another aspect of the invention includes the conductive polymer poly(selenolo[2,3-c]thiophene). The polymers for use with this disclosure may include copolymers further comprising polymerized units of an electroactive monomer. Electroactive monomers may be selected from the group consisting of thiophenes, thieno[3,4-b]thiophene, thieno[3,2-b] thiophene, substituted thiophenes, substituted thieno[3,4-b] thiophenes, substituted thieno[3,2-b]thiophene, dithieno[3,4-b:3',4'-d]thiophene, selenophenes, substituted selenophenes, pyrrole, bithiophene, substituted pyrroles, phenylene, substituted phenylenes, naphthalene, substituted naphthalenes, biphenyl and terphenyl, substituted terphenyl, phenylene vinylene, substituted phenylene vinylene, fluorene, substituted fluorenes. In addition to electroactive monomers, the copolymers according to the present invention may include polymerized units of a non-electroactive monomers.

Polyaniline compounds which can be used in the present invention can be obtained from aniline monomers having Formula III below:

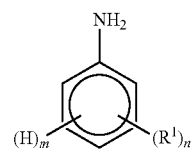

wherein n is an integer from 0 to 4; m is an integer from 1 to 5, with the proviso that n+m=5; and R1 is independently selected so as to be the same or different at each occurrence and is selected from alkyl, alkenyl, alkoxy, cycloalkyl, cycloalkenyl, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, carboxylic acid, halogen, cyano, or alkyl substituted with one or more of sulfonic acid, carboxylic acid, halo, nitro, cyano or epoxy moieties; or any two R1 groups together may form an alkylene or alkenylene chain completing a 3, 4, 5, 6, or 7-membered aromatic or alicyclic ring, which ring may optionally include one or more divalent nitrogen, sulfur or oxygen atoms.

The polymerized material comprises aniline monomer units, each of the aniline monomer units having a formula selected from Formula IV below:

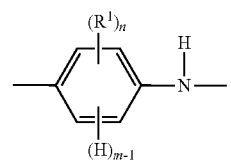

or Formula V below:

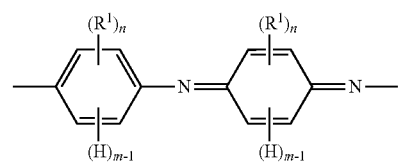

wherein n, m, and R1 are as defined above. In addition, the polyaniline may be a homopolymer or a co-polymer of two or more aniline monomeric units.

The compositions of the present invention are not limited to the homopolymeric structures above and may include hetereopolymeric or copolymeric structures. The copolymeric structures may be any combination of alternating copolymers (e.g., alternating A and B units), periodic copolymers (e.g., (A-B-A-B-B-A-A-A-A-B-B-B)n), random copolymers (e.g., random sequences of monomer A and B), statistical copolymers (e.g., polymer sequence obeying statistical rules) and/or block copolymers (e.g., two or more homopolymer subunits linked by covalent bonds). The copolymers may be branched or linked, provided the resultant copolymer maintains the properties of electrical conductivity.

Dispersion polymeric acids contemplated for use in the practice of the invention are insoluble in water, and may form colloids when dispersed into a suitable aqueous medium. The polymeric acids typically have a molecular weight in the range of about 10,000 to about 4,000,000. In one embodiment, the polymeric acids have a molecular weight of about 50,000 to about 2,000,000. Other acceptable polymeric acids comprise at least one member of polymer phosphoric acids, polymer carboxylic acids, and polymeric acrylic acids, and mixtures thereof, including mixtures having partially fluorinated polymeric acids. In another embodiment, the polymeric sulfonic acid comprises a fluorinated acid. In still another embodiment, the colloid-forming polymeric sulfonic acid comprises a perfluorinated compound. In yet another embodiment, the colloid-forming polymeric sulfonic acid comprises a perfluoroalkylenesulfonic acid.

In still another embodiment, the colloid-forming polymeric acid comprises a highly-fluorinated sulfonic acid polymer ("FSA polymer"). "Highly fluorinated" means that at least about 50% of the total number of halogen and hydrogen atoms in the polymer are fluorine atoms, and in one embodiment at least about 75%, and in another embodiment at least about 90%. In one embodiment, the polymer comprises at least one perfluorinated compound.

The polymeric acid can comprise sulfonate functional groups. The term "sulfonate functional group" refers to either sulfonic acid groups or salts of sulfonic acid groups, and in one embodiment comprises at least one of alkali metal or ammonium salts. The functional group is represented by the formula —$SO_3X$ where X comprises a cation, also known as a "counterion". X can comprise at least one member selected from the group consisting of H, Li, Na, K or $N(R_1)(R_2)(R_3)(R_4)$, and $R_1$, $R_2$, $R_3$, and $R_4$ are the same or different, and are in one embodiment H, $CH_3$ or $C_2H_5$. In another embodiment, X comprises H, in which case the polymer is said to be in the "acid form". X may also be multivalent, as represented by such ions as $Ca^{2+}$, $Al^{3+}$, $Fe^{2+}$ and $Fe^{3+}$. In the case of multivalent counterions, represented generally as $M^{n+}$, the number of sulfonate functional groups per counterion will be equal to the valence "n".

In one embodiment, the FSA polymer comprises a polymer backbone with recurring side chains attached to the backbone, the side chains carrying cation exchange groups. Polymers include homopolymers or copolymers of two or more monomers. Copolymers are typically formed from a nonfunctional monomer and a second monomer carrying a cation exchange group or its precursor, e.g., a sulfonyl fluoride group (—$SO_2F$), which can be subsequently hydrolyzed to a sulfonate functional group. For example, copolymers comprising a first fluorinated vinyl monomer together with a second fluorinated vinyl monomer having a sulfonyl fluoride group (—$SO_2F$) can be used. Examples of suitable first monomers comprise at least one member from the group of tetrafluoroethylene (TFE), hexafluoropropylene, vinyl fluoride, vinylidine fluoride, trifluoroethylene, chlorotrifluoroethylene, perfluoro(alkyl vinyl ether), and combinations thereof. TFE is a desirable first monomer.

In other embodiments, examples of second monomers comprise at least one fluorinated vinyl ether with sulfonate functional groups or precursor groups which can provide the desired side chain in the polymer. Additional monomers, including ethylene, In one embodiment, FSA polymers for use in the present invention comprise at least one highly fluorinated FSA, and in one embodiment perfluorinated, carbon backbone and side chains represented by the formula

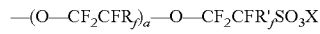

—(O—$CF_2CFR_f$)$_a$—O—$CF_2CFR'_fSO_3X$ wherein $R_f$ and $R'_f$ are independently selected from F, Cl or a perfluorinated alkyl group having 1 to 10 carbon atoms, a=0, 1 or 2, and X comprises at least one of H, Li, Na, K or $N(R_1)(R_2)(R_3)(R_4)$ and $R_1$, $R_2$, $R_3$, and $R_4$ are the same or different and are and in one embodiment H, $CH_3$ or $C_2H_5$. In another embodiment X comprises H. As stated above, X may also be multivalent.

In another embodiment, the FSA polymers include, for example, polymers disclosed in U.S. Pat. Nos. 3,282,875, 4,358,545 and 4,940,525 (all hereby incorporated by reference in their entirety). An example of a useful FSA polymer comprises a perfluorocarbon backbone and the side chain represented by the formula

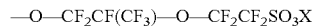

—O—$CF_2CF(CF_3)$—O—$CF_2CF_2SO_3X$ where X is as defined above. FSA polymers of this type are disclosed in U.S. Pat. No. 3,282,875 and can be made by copolymerization of tetrafluoroethylene (TFE) and the perfluorinated vinyl ether $CF_2$=CF—O—$CF_2CF(CF_3)$—O—$CF_2CF_2SO_2F$, perfluoro(3,6-dioxa-4-methyl-7-octenesulfonyl fluoride) (PDMOF), followed by conversion to sulfonate groups by hydrolysis of the sulfonyl fluoride groups and ion exchanged as necessary to convert them to the desired ionic form. An example of a polymer of the type disclosed in U.S. Pat. Nos. 4,358,545 and 4,940,525 has the side chain —O—$CF_2CF_2SO_3X$, wherein X is as defined above. This polymer can be made by copolymerization of tetrafluoroethylene (TFE) and the perfluorinated vinyl ether $CF_2$=CF—O—$CF_2CF_2SO_2F$, perfluoro(3-oxa-4-pentenesulfonyl fluoride) (POPF), followed by hydrolysis and further ion exchange as necessary.

In another embodiment, the FSA polymers include, for example, polymers disclosed in US 2004/0121210 A1; hereby incorporated by reference in its entirety. An example of a useful FSA polymer can be made by copolymerization of tetrafluoroethylene (TFE) and the perfluorinated vinyl ether $CF_2$=CF—O—$CF_2CF_2CF_2CF_2SO_2F$ followed by conversion to sulfonate groups by hydrolysis of the sulfonyl fluoride groups and ion exchanged as desired to convert the fluoride groups to the desired ionic form. In another embodiment, the FSA polymers include, for example, polymers disclosed in US2005/0037265 A1; hereby incorporated by reference in its entirety. An example of a useful FSA polymer can be made by copolymerization of $CF_2$=$CFCF_2OCF_2CF_2SO_2F$ and tetrafluoroethylene followed by conversion to sulfonate groups by KOH hydrolysis of the sulfonyl fluoride groups and ion exchanged with acid to convert the potassium ion salt to the acid form.

Aqueous dispersions comprising colloid-forming polymeric acids, including FSA polymers, typically have particle sizes as small as possible, so long as a stable colloid is formed. Aqueous dispersions of FSA polymer are available commercially as NAFION® dispersions, from E. I. du Pont de Nemours and Company (Wilmington, Del.). An example of a suitable FSA polymer comprises a copolymer having a structure:

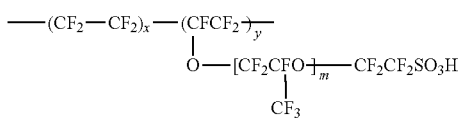

The copolymer comprises tetrafluoroethylene and perfluoro (4-methyl-3,6-dioxa-7-octene-1-sulfonic acid) wherein m=1.

Aqueous dispersions of FSA polymer from US2004/0121210 A1 or US2005/0037265 A1 could be made by using the methods disclosed in U.S. Pat. No. 6,150,426; the disclosure of the previously identified U.S. patents and patent applications is hereby incorporated by reference in their entirety.

Other suitable FSA polymers are disclosed in U.S. Pat. No. 5,422,411; hereby incorporated by reference in its entirety. One such suitable polymeric acid that can be used as counter ion/dispersant for polythienothiophenes can have the following structure:

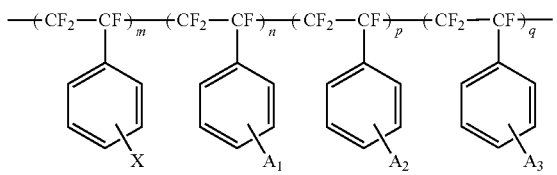

wherein at least two of m, n, p and q are integers greater than zero; $A_1$, $A_2$, and $A_3$ are selected from the group consisting of alkyls, halogens, $C_yF_{2y+1}$ where y is an integer greater than zero, O—R (where R is selected from the group consisting of alkyl, perfluoroalkyl and aryl moieties), $CF=CF_2$, $CN$, $NO_2$ and $OH$; and X is selected from the group consisting of $SO_3H$, $PO_2H_2$, $PO_3H_2$, $CH_2PO_3H_2$, $COOH$, $OPO_3H_2$, $OSO_3H$, $OArSO_3H$ where Ar is an aromatic moiety, $NR_3^+$ (where R is selected from the group consisting of alkyl, perfluoroalkyl and aryl moieties), and $CH_2NR_3^+$ (where R is selected from the group consisting of alkyl, perfluoroalkyl and aryl moieties). The $A_1$, $A_2$, $A_3$ and X substituents may be located in the ortho, meta and/or para positions. The copolymer may also be binary, ternary or quaternary.

The compositions of the present invention are not limited to the homopolymeric structures above and may include hetereopolymeric or copolymeric structures. The copolymeric structures may be any combination of alternating copolymers (e.g., alternating A and B units), periodic copolymers (e.g., (A-B-A-B-B-A-A-A-A-B-B-B)n), random copolymers (e.g., random sequences of monomer A and B), statistical copolymers (e.g., polymer sequence obeying statistical rules) and/or block copolymers (e.g., two or more homopolymer subunits linked by covalent bonds). The copolymers may be branched or linked, provided the resultant copolymer maintains the properties of electrical conductivity. The copolymer structures may be formed from monomeric, oligomeric or polymeric compounds. For example, monomers suitable for use in the copolymer system may include monomers such as thiophene, substituted thiophenes, substituted thieno[3,4-b] thiophenes, dithieno[3,4-b:3',4'-d]thiophene, pyrrole, bithiophene, substitued pyrroles, phenylene, substituted phenylenes, naphthalene, substituted naphthalenes, biphenyl and terphenyl, substituted terphenyl, phenylene vinylene and substituted phenylene vinylene.

In addition to thienothiophene or the thieno[3,4-b] thiophene monomers, other thiophene or selenophene monomeric compounds may be utilized in the present invention, provided that the resultant polymer is electrically conductive and includes a pH adjusted to a value of about 3 to about 10.

In some cases, the dispersion can include at least one metal (e.g., at least one ion). Examples of metals that can be added or present in the dispersion comprise at least one member selected from the group consisting of $Fe^{2+}$, $Fe^{3+}$, $K^+$, and $Na^+$, and combinations thereof. The oxidizer:monomer molar ratio is usually about 0.05 to about 10, generally in the range of about 0.5 to about 5. (e.g., during the inventive polymerization steps). If desired, the amount of metal can be lowered or removed by exposing the dispersion to cationic and ionic exchange resins.

The monomer polymerization for the conductive polymer can be carried out in the presence of co-dispersing liquids which are normally miscible with water. Examples of suitable co-dispersing liquids comprise at least one member selected from the group consisting of ethers, alcohols, ethers, cyclic ethers, ketones, nitriles, sulfoxides, and combinations thereof. In one embodiment, the amount of co-dispersing liquid is less than about 30% by volume. In one embodiment, the amount of co-dispersing liquid is less than about 60% by volume. In one embodiment, the amount of co-dispersing liquid is between about 5% to about 50% by volume. In one embodiment, the co-dispersing liquid comprises at least one alcohol. In one embodiment, the co-dispersing liquid comprises at least one member selected from the group of n-propanol, isopropanol, t-butanol, methanol, dimethylacetamide, dimethylformamide, N-methylpyrrolidone. The co-dispersing liquid can comprise an organic acid such as at least one member selected from the group consisting of p-toluenesulfonic acid, dodecylbenzenesulfonic acid, methanesulfonic acid, trifluoromethanesulfonic acid, camphorsulfonic acid, acetic acid, mixtures thereof and the like. Alternatively, the acid can comprise a water soluble polymeric acid such as poly(styrenesulfonic acid), poly(2-acrylamido-2-methyl-1-propanesulfonic acid), or the like, or a second colloid-forming acid, as described above. Combinations of acids can also be used.

In another embodiment, the invention relates to electronic devices comprising at least one electroactive layer (usually a semiconductor conjugated small molecule or polymer) positioned between two electrical contact layers, wherein at least one of the layers of the device includes the inventive hole injection layer. One embodiment of the present invention is illustrated by an OLED device, as shown in FIG. 1. Referring now to FIG. 1, FIG. 1 illustrates a device that comprises an anode layer 110, a hole injection layer 120, an electroluminescent layer 130, and a cathode layer 150. Adjacent to the cathode layer 150 is an optional electron-injection/transport layer 140. Between the hole injection layer 120 and the cathode layer 150 (or optional electron injection/transport layer 140) is the electroluminescent layer 130. Alternatively, a layer of hole transport and/or electron blocking layer, commonly termed interlayer, can be inserted between the hole injection layer 120 and the electroluminescent layer 130.

The device may include a support or substrate (not shown) that can be adjacent to the anode layer 110 or the cathode layer 150. Most frequently, the support is adjacent the anode layer 110. The support can be flexible or rigid, organic or inorganic. Generally, glass or flexible organic films are used as a support (e.g., a flexible organic film comprising poly (ethylene terephthalate), poly(ethylene naphthalene-2,6,-dicarboxylate), and polysulfone). The anode layer 110 comprises an electrode that is more efficient for injecting holes compared to the cathode layer 150. The anode can comprise materials containing a metal, mixed metal, alloy, metal oxide or mixed oxide. Suitable materials comprise at last one member selected from the group consisting of mixed oxides of the Group 2 elements (e.g., Be, Mg, Ca, Sr, Ba, Ra), the Group 11 elements, the elements in Groups 4, 5, and 6, and the Group 8-10 transition elements (The IUPAC number system is used throughout, where the groups from the Periodic Table are numbered from left to right as 1-18 [CRC Handbook of Chemistry and Physics, 81$^{st}$ Edition, 2000]). If the anode layer 110 is light transmitting, then mixed oxides of Groups 12; 13 and 14 elements, such as indium-tin-oxide, may be used. As used herein, the phrase "mixed oxide" refers to oxides having two or more different cations selected from the Group 2 elements or the Groups 12, 13, or 14 elements. Some non-limiting, specific examples of materials for anode layer 110 include, comprise at least one member selected from the group consisting of indium-tin-oxide ("ITO"), aluminum-tin-oxide, doped zinc oxide, gold, silver, copper, and nickel. The anode may also comprise a conductive organic material such as polyaniline, polythiophene or polypyrrole.

The anode layer 110 may be formed by a chemical or physical vapor deposition process or spin-cast process. Chemical vapor deposition may be performed as a plasma-enhanced chemical vapor deposition ("PECVD") or metal organic chemical vapor deposition ("MOCVD"). Physical vapor deposition can include all forms of sputtering, including ion beam sputtering, as well as e-beam evaporation and resistance evaporation. Specific forms of physical vapor deposition include RF magnetron sputtering and inductively-coupled plasma physical vapor deposition ("IMP-PVD"). These deposition techniques are well known within the semiconductor fabrication arts.

The anode layer 110 may be patterned during a lithographic operation. The pattern may vary as desired. The layers can be formed in a pattern by, for example, positioning a patterned mask or resist on the first flexible composite barrier structure prior to applying the first electrical contact layer material. Alternatively, the layers can be applied as an overall layer (also called blanket deposit) and subsequently patterned using, for example, a patterned resist layer and wet chemical or dry etching techniques. Other processes for patterning that are well known in the art can also be used. When the electronic devices are located within an array, the anode layer 110 typically is formed into substantially parallel strips having lengths that extend in substantially the same direction.

The hole injection layer 120 is usually cast onto substrates using a variety of techniques well-known to those skilled in the art. Typical casting techniques include, for example, solution casting, drop casting, curtain casting, spin-coating, screen printing, inkjet printing, among others When the hole injection layer is applied by spin coating, the viscosity and solid contents of the dispersion, and the spin rate can be employed to adjust the resultant film thickness. Films applied by spin coating-are generally continuous and without pattern. Alternatively, the hole injection layer can be patterned using a number of depositing processes, such as ink jet-printing such as described in U.S. Pat. No. 6,087,196; hereby incorporated by reference.

The electroluminescent (EL) layer 130 may typically be a conjugated polymer, such as poly(paraphenylenevinylene), abbreviated as PPV, polyfluorene, spiropolyfluorene or other EL polymer material. The EL layer can also comprise relatively small molecules fluorescent or phosphorescent dye such as 8-hydroxquinoline aluminum ($Alq_3$) and tris(2-(4-tolyl)phenylpyridine) Iridium (III), a dendrimer, a blend that contains the above-mentioned materials, and combinations. The EL layer can also comprise inorganic quantum dots or blends of semiconducting organic material with inorganic quantum dots. The particular material chosen may depend on the specific application, potentials used during operation, or other factors. The EL layer 130 containing the electroluminescent organic material can be applied from solutions by any conventional technique, including spin-coating, casting, and printing. The EL organic materials can be applied directly by vapor deposition processes, depending upon the nature of the materials. In another embodiment, an EL polymer precursor can be applied and then converted to the polymer, typically by heat or other source of external energy (e.g., visible light or UV radiation).

Optional layer 140 can function both to facilitate electron injection/transport, and can also serve as a confinement layer to prevent quenching reactions at layer interfaces. That is, layer 140 may promote electron mobility and reduce the likelihood of a quenching reaction that can occur when layers 130 and 150 are in direct contact. Examples of materials for optional layer 140 comprise at least one member selected from the group consisting of metal-chelated oxinoid compounds (e.g., $Alq_3$ or the like); phenanthroline-based compounds (e.g., 2,9-dimethyl-4,7-diphenyl- 1,10-phenanthroline ("DDPA"), 4,7-diphenyl-1,10-phenanthroline ("DPA"), or the like); azole compounds (e.g., 2-(4-biphenylyl)-5-(4-t-butylphenyl)-1,3,4-oxadiazole ("PBD" or the like), 3-(4-biphenylyl)-4-phenyl-5-(4-t-butylphenyl)-1,2,4-triazole ("TAZ" or the like); other similar compounds; or any one or more combinations thereof. Alternatively, optional layer 140 may be inorganic and comprise BaO, CaO, LiF, CsF, NaCl, $Li_2O$, mixtures thereof, among others.

The cathode layer 150 comprises an electrode that is particularly efficient for injecting electrons or negative charge carriers. The cathode layer 150 can comprise any suitable metal or nonmetal having a lower work function than the first electrical contact layer (in this case, the anode layer 110). As used herein, the term "lower work function" is intended to mean a material having a work function no greater than about 4.4 eV. As used herein, "higher work function" is intended to mean a material having a work function of at least approximately 4.4 eV.

Materials for the cathode layer can be selected from alkali metals of Group 1 (e.g., Li, Na, K, Rb, Cs,), the Group 2 metals (e.g., Mg, Ca, Ba, or the like), the Group 12 metals, the lanthanides (e.g., Ce, Sm, Eu, or the like), and the actinides (e.g., Th, U, or the like). Materials such as aluminum, indium, yttrium, and combinations thereof, may also be used. Specific non-limiting examples of materials for the cathode layer 150 comprise at least one member selected from the group consisting of calcium, barium, lithium, cerium, cesium, europium, rubidium, yttrium, magnesium, samarium, and alloys and combinations thereof. When a reactive low work function metal such as Ca, Ba or Li is used, an overcoat of a more inert metal, such as silver or aluminum, can be used to protect the reactive metal and lower the cathode resistance.

The cathode layer 150 is usually formed by a chemical or physical vapor deposition process. In general, the cathode layer will be patterned, as discussed above in reference to the anode layer 110. If the device lies within an array, the cathode layer. 150 may be patterned into substantially parallel strips, where the lengths of the cathode layer strips extend in substantially the same direction and substantially perpendicular to the lengths of the anode layer strips. Electronic elements called pixels are formed at the cross points (where an anode layer strip intersects a cathode layer strip when the array is seen from a plan or top view). For top emitting devices, a very thin layer of low work function metal such as Ca and Ba combined with a thicker layer transparent conductor such as ITO can be used as transparent cathode. Top emitting devices are beneficial in active matrix display because larger aperture ratio can be realized. Examples of such devices are described in "Integration of Organic LED's and Amorphous Si TFT's onto Flexible and Lightweight Metal Foil Substrates"; by C. C. Wu et al; IEEE Electron Device Letters, Vol.18, No. 12, December 1997, hereby incorporated by reference.

In other embodiments, additional layer(s) may be present within organic electronic devices. For example, a layer (not shown) between the hole injection layer 120 and the EL layer 130 may facilitate positive charge transport, energy-level matching of the layers, function as a protective layer, among other functions. Similarly, additional layers (not shown) between the EL layer 130 and the cathode layer 150 may facilitate negative charge transport, energy-level matching between the layers, function as a protective layer, among other functions. Layers that are known in the art can be also be included. In addition, any of the above-described layers can be made of two or more layers. Alternatively, some or all of inorganic anode layer 110, the hole injection layer 120, the EL layer 130, and cathode layer 150, may be surface treated to increase charge carrier transport efficiency. The choice of materials for each of the component layers may be determined by balancing the goals of providing a device with high device efficiency and longer device lifetime with the cost of manufacturing, manufacturing complexities, or potentially other factors.

The different layers may have any suitable thickness. Inorganic anode layer 110 is usually no greater than approximately 500 nm, for example, approximately 10-200 nm; hole injection layer 120, is usually no greater than approximately 300 nm, for example, approximately 30-200 nm; EL layer 130, is usually no greater than approximately 1000 nm, for example, approximately 30-500 nm; optional layer 140 is usually no greater than approximately 100 nm, for example, approximately 20-80 nm; and cathode layer 150 is usually no greater than approximately 300 nm, for example, approximately 1-150 nm. If the anode layer 110 or the cathode layer 150 needs to transmit at least some light, the thickness of such layer may not exceed approximately 150 nm.

Depending upon the application of the electronic device, the EL layer 130 can be a light-emitting layer that is activated by signal (such as in a light-emitting diode) or a layer of material that responds to radiant energy and generates a signal with or without an applied potential (such as detectors or photovoltaic cells). The light-emitting materials may be dispersed in a matrix of another material, with or without additives, and may form a layer alone. The EL layer 130 generally has a thickness in the range of approximately 30-500 nm.

Examples of other organic electronic devices that may benefit from having one or more layers comprising the aqueous dispersion comprising polythienothiophene made with polymeric acid colloids comprise: (1) devices that convert electrical energy into radiation (e.g., a light-emitting diode, light emitting diode display, or diode laser), (2) devices that detect signals through electronics processes (e.g., photodetectors (e.g., photoconductive cells, photoresistors, photoswitches, phototransistors, phototubes), IR detectors), (3) devices that convert radiation into electrical energy, (e.g., a photovoltaic device or solar cell), and (4) devices that include one or more electronic components that include one or more organic semi-conductor layers (e.g., a transistor or diode).

Organic light emitting diodes (OLEDs) inject electrons and holes from the cathode 150 and anode 110 layers, respectively, into the EL layer 130, and form negative and positively charged polarons in the polymer. These polarons migrate under the influence of the applied electric field, forming an exciton with an oppositely charged polarons and subsequently undergoing radiative recombination. A sufficient potential difference between the anode and cathode, usually less than approximately 12 volts, and in many instances no greater than approximately 5 volts, may be applied to the device. The actual potential difference may depend on the use of the device in a larger electronic component. In many embodiments, the anode layer 110 is biased to a positive voltage and the cathode layer 150 is at substantially ground potential or zero volts during the operation of the electronic device. A battery or other power source(s), not shown, may be electrically connected to the electronic device as part of a circuit.

One aspect of the invention relating to using at least one additive in the conductive polymer dispersion comprising fluorinated colloid-forming polymeric dispersant so at least one of the following properties can be met:

1. The boiling temperature of the additive is higher than about 85 deg C. at 760 mm Hg
2. The conductive polymer dispersion has a dynamic surface tension at about 100 ms surface age of less than about 60 dynes/cm
3. The wt % of additive in the dispersion is less than the solubility limit of the additive in water.

Additives useful for the current invention can comprise organic liquids commonly characterized as solvents/humectants. These include, but are not limited to (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol;

(2) polyhydric alcohols, such as ethylene glycol, diethylene glycol, triethylene glycol, tetraethylene glycol, propylene glycol, polyethylene glycol, glycerol, 2-methyl-2,4-pentanediol, 1,2,6-hexanetriol, 2-ethyl-2-hydroxymethyl-1,3-propanediol, 1,5 pentanediol, 1,2-hexanediol, and thioglycol;

(3) lower mono- and di-alkyl ethers derived from the polyhydric alcohols;

(4) nitrogen-containing compounds such as 2-pyrrolidone, N-methyl-2-pyrrolidone, and 1,3-dimethyl-2-imidazolidinone; and (5) sulfur-containing compounds such as 2,2'-thiodiethanol, dimethyl sulfoxide and tetramethylene sulfone, (6) Ketones, ethers and esters.

Examples of polyhydric alcohols suitable for use a film forming additive include, but are not limited to, ethylene glycol, diethylene glycol(DEG), triethylene glycol, propylene glycol, tetraethylene glycol, polyethylene glycol, glycerol, 2-methyl-2,4-pentanediol, 2-ethyl-2-hydroxymethyl-1,3-propanediol(EHMP), 1,5 pentanediol, 1,2-hexanediol, 1,2,6-hexanetriol and thioglycol. Examples of lower alkyl mono- or di-ethers derived from polyhydric alcohols include, but are not limited to, ethylene glycol mono-methyl or mono-ethyl ether, diethylene glycol mono-methyl or mono-ethyl ether, propylene glycol mono-methyl, mono-ethyl and propyl ether, triethylene glycol mono-methyl, mono-ethyl or mono-butyl ether (TEGMBE), diethylene glycol di-methyl or di-ethyl ether, poly(ethylene glycol) monobutyl ether (PEGMBE), diethylene glycol monobutylether(DEGMBE) and propylene glycol methyl ether acetate. Commercial examples of such compounds include Dow P-series and E-series glycol ethers in the Carbitol™ and Dowanol® product family, available from Dow Chemical Company, Midland, Mich.

Examples of ketones or ketoalcohols suitable for use a film forming additive include, but are not limited to, acetone, methyl ethyl ketone and diacetone alcohol. Examples of ethers include, but not limited to tetrahydrofuran and dioxane, and examples of esters include, but not limited to ethyl lactate, ethylene carbonate and propylene carbonate.

Film forming additives useful for the current invention may also include at least one surfactant. The surfactants may be anionic, cationic, amphoteric or nonionic and used at levels of 0.005 to 2% of the ink composition. Examples of useful surfactants include, but not limited to, from those disclosed in U.S. Pat. Nos. 5,324,349; 4,156,616 and 5,279,654, which are herein incorporated by reference in their entirety, as well as many other surfactants known in the printing and coating art. Commercial surfactants include the Surfynols™, Dynol™ from Air Products; the Zonyls™ from DuPont and the Fluorads™ (now Novec™) from 3M. Examples of silicon surfactants are available from BYK-Chemie as BYK surfactants, and from Crompton Corp, as Silwet™ surfactants. Commercially available fluorinated surfactants can be the Zonyls™ from DuPont and the Fluorads™ (now Novec™) from 3M, they can be used alone or in combination with other surfactants.

Combinations of film forming additives may also be utilized. Film forming additives can be selected (viscosity modifier, surface tension modifier) within the following design space in order to provide desirable film forming properties. This can permit dispersions of the instant invention to be employed by electronic device manufacturers in a broad range of applications, including light emitting display, solid state lighting, photovoltaic cells and thin film transistors.
1. The boiling temperature of the additive is higher than about 85 deg C. at about 760 mm Hg
2. The conductive polymer dispersion has a dynamic surface tension at about 100 ms surface age of less than about 60 dynes/cm
3. The wt % of additive in the dispersion is less than the solubility limit of the additive in water.

The boiling temperature of the film forming additive is typically related to processibility of the dispersion when depositing a film upon the substrate due to its impact on evaporation rate. For example, normally there are three sequential stages in a typical spin coating process: 1) the deposition, 2) spin up, and 3) spin off. The evaporation stage occurs throughout the entire process thereby becoming the primary means of thinning near the end. Evaporation is a complex process by which a portion of the excess solvent is absorbed into the atmosphere. If significant evaporation occurs prematurely, a solid skin forms on the fluid surface which impedes the evaporation of solvent trapped under this skin and, when subjected to the centrifugal forces of the spinning substrate, causes coating defects. Therefore, in order to obtain good film formation, boiling temperature of the additives in the dispersion should be considered. For other deposition methods such as rod coating, inkjet printing, gravure coating, reverse coating, spraying coating, etc., the physical process taking place during the deposition step maybe different, however, the importance of selecting additive with certain boiling temperature criteria is still relevant.

In one aspect of the invention, a range of boiling temperature of the additive is higher than 85 deg C. at 760 mm Hg. When the additive and water forms an azeotropic mixture, the lower of the two boiling temperatures (boiling temperature of the azeotropic mixture or boiling temperature of the additive) is useful to be higher than 85 deg C. at 760 mm Hg.

The dynamic surface tension of the conductive polymer ink is another parameter for determining the wetting behavior of the liquid on the substrate during a deposition process for forming a film. This is because the interfaces are produced relatively quickly in processes such as printing or coating. In such processes it is not just the equilibrium value of the interfacial tension that is influential, but also the kinetics of the interface formation. The molecular mobility of the additives used is an influential factor on the formation of the surface tension. For example, on a printing press, ink is picked up from the ink tray by a roller that rotates at a certain speed, through a number of degrees until the ink is deposited on the substrate (paper, plastic, etc.). The time it takes for the ink to get from the ink tray to the substrate is the process time for these press conditions. Surface tension during this time scale can impact the wetting of the ink and the substrates. More specifically, a positive spreading coefficient results when the dynamic surface tension of the ink is lower than the surface energy of the substrate. If the speed of the press is increased, so that the migration time of the surfactant is reduced, then the press will operate higher on the dynamic curve and the dynamic surface tension of the ink may now be higher than the surface energy of the substrate, resulting in relatively poor printing quality.

It is known that wetting is the contact between a fluid and a surface. When a liquid has a high surface tension (strong internal bonds), it tends to form a droplet on the surface. Whereas a liquid with low surface tension tends to spread out over a greater area (bonding to the surface). On the other hand, if a solid surface has high surface energy (or surface tension), a drop will spread, or wet, the surface. If the solid surface has low surface energy, a droplet will form. This phenomenon is a result of the minimization of interfacial energy. The primary measurement to determine wettability is a contact angle measurement. This measures the angle between the surfaces of a liquid droplet on the solid surface.

In one aspect of the instant invention, the conductive polymer dispersion after the addition of the additives has a dynamic surface tension at 100 ms surface age to be less than 60 dynes/cm. In some cases less than 50 dynes/cm, or less than 40 dynes/cm, or less than 35 dynes/cm, or less than 30 dynes/cm.

Solubility is a chemical property referring to the ability for a given substance, the solute, to dissolve in a solvent. Solubility is measured in terms of the maximum amount of solute dissolved in a solvent at equilibrium. Since the main carrier in the conductive polymer dispersion is water, it is useful for the additive to be able to form a uniform solution in the formulated ink. One way of achieving that is to limit the amount of additive added to the ink so that the wt % of additive in the ink is under the solubility limit of the additive in water.

In some aspects of the invention, the wt % of additive added in the ink is 95% of the maximum solubility. If desired, the wt % of additive added in the ink is 90% of the maximum solubility, or the wt % of additive added in the ink is 80% of the maximum solubility.

The device formed using the dispersion of the present disclosure includes a conductive polymeric film and a conductive polymeric film disposed on a substrate. The films of this invention are typically applied to an article. The film may be deposited utilizing any suitable technique known in the art for applying polymer films. The film application or fabrication methods include but are not limited to spin coating, doctor blade coating, ink jet printing, screen printing, thermal transfer printing, microcontact printing or nozzle printing as disclosed in U.S. Pat. No. 7,040,945B2 by Dainippon Screen Mfg. Co, which is hereby incorporated by reference in its entirety. Thickness of the film can range from 2 nm to 1000 nm, or from 20 nm to 500 nm, or from 50 nm to 200 nm. After the film is deposited from the dispersion, the film may be dried in air or heated at a temperature from 50° C. to 250° C., or, if desired, from 100° C. to 200° C. to remove the residual solvent, or other volatiles and, in some applications, in an inert atmosphere.

In certain embodiments, the film is deposited on a substrate surface and dried. The conductive film within the device can includes a conductivity of from about $10^{-6}$ S/cm to about 300 S/cm. "Drying" and variations thereof include air-drying, forced air drying, drying at elevated temperatures and annealing of the polymer film. "Annealing", "Annealed" and variations thereof include heating of a solid material at a sufficient temperature for a sufficient time, where a portion or most of solvent and/or water therein volatilizes.

In accordance with other embodiments, the present disclosure relates to organic electronic devices, including electroluminescent devices, comprising hole injection layer of the inventive compositions. In addition, the present invention permits fabricating multiple layered devices having acceptable lifetime performance. By "lifetime" it is meant the length of time taken for an initial brightness of a continuously operating device (e.g., a PLED) to decrease to a ratio of the initial brightness that is acceptable for the targeted application (e.g., 50% of the initial brightness).

EXAMPLES

Conductive Polymer Dispersion D1
(poly(thieno[3,4-b]thiophene (PTT)/NAFION®
18:1)

1700 grams of deionized water was added to a 3L jacketed reactor. 600 grams of a 12% NAFIONO dispersion in water (Dupont Co.) was added to the reactor and mixed for 5 minutes with an overhead stirrer. The jacketed flask was adjusted to maintain a 22° C. reaction temperature. 4 grams (28.6 mmol) of thieno[3,4-b]thiophene was separately co-fed into the reactor with 17.7 grams (34.2 mmole) of $Fe_2(SO4)_3*H_2O$ dissolved in 350 grams of deionized water. The reaction mass turned from light green to emerald green to dark blue within 20 minutes. Polymerization was allowed to proceed for 4 hours after the introduction of monomer and oxidant. The resulting dispersion was then purified by adding the contents of the reactor to a 4L Nalgene® bottle containing 94.0 grams of Amberlite® IR-120 cation exchange resin (Sigma-Aldrich Chemical Co) and 94.0 grams of Lewatit® MP-62 anion exchange resin (Fluka, Sigma-Aldrich Chemical Co), resulting in an opaque dark blue aqueous poly(thieno[3,4-b] thiophene)/NAFION® dispersion. The dispersion was filtered sequentially through 5, 0.65 and 0.45 micron pore size filters. The dispersion was analyzed for residual metal ions by ICP-MS with the following ions being detected: Al (<1 ppm); Ba (<1 ppm); Ca (<20 ppm); Cr (<1 ppm), Fe (37 ppm); Mg (<1 ppm); Mn (<1 ppm); Ni (<1 ppm); Zn (<1 ppm); Na (<=6 ppm); K (<1 ppm). The final dispersion has a solid content of 2.86%, NAFION to TT weight ratio of 18:1, Viscosity of 2.1 mPa.s and pH of 2.4.

Conductive Polymer Dispersion D2 (PTT/NAFION 12:1)

1700 grams of deionized water was added to a 3L jacketed reactor. 600 grams of a 12% NAFION® dispersion in water (Dupont Co.) was added to the reactor and mixed for 5 minutes with an overhead stirrer. The jacketed flask was adjusted to maintain a 220 C reaction temperature. 6 grams(42.9 mmol) of thieno[3,4-b]thiophene was separately co-fed into the reactor with 26.6 grams ( 51.4 mmole) of $Fe_2(SO_4)_3*H_2O$ dissolved in 525 grams of deionized water. The reaction mass turned from light green to emerald green to dark blue within 20 minutes. Polymerization was allowed to proceed for 4 hours after the introduction of monomer and oxidant. The resulting dispersion was then purified by adding the contents of the reactor to a 4L Nalgene® bottle containing 141 grams of Amberlite® IR-120 cation exchange resin (Sigma-Aldrich Chemical Co) and 141 grams of Lewatit® MP-62 anion exchange resin (Fluka, Sigma-Aldrich Chemical Co), resulting in an opaque dark blue aqueous poly(thieno[3,4-b] thiophene)/NAFION® dispersion. The dispersion was filtered sequentially through 5, 0.65 and 0.45 micron pore size filters. The dispersion was analyzed for residual metal ions by ICP-MS with the following ions being detected: Al (<1 ppm); Ba (<1 ppm); Ca (<20 ppm); Cr (<1 ppm), Fe (29 ppm); Mg (<1 ppm); Mn (<1 ppm); Ni (<1 ppm); Zn (<1 ppm); Na (<=6 ppm); K (<1 ppm). The final dispersion has a solid content of 3.17%, NAFION to TT weight ratio of 12:1, Viscosity of 2.4 mPa.s and pH of 2.5.

Conductive Polymer Dispersion D3 (PTT/PSSA)

Dispersion D3 is a dispersion of poly(thieno[3,4-b] thiophene) made using poly(styrene sulfonic acid) as the polymeric counter ion/dopant/dispersant according to U.S. Patent Application Publication No. US2005-0151122-A1; hereby incorporated by reference in its entirety. The final dispersion has a solid content of 2.36%, PSSA to TT weight ratio of 16:1, Viscosity of 3.2 mpa.s and pH of 2.1.

Example A

Conductive Polymer Dispersion Inks with Additives of Certain Design Parameters for Improved Substrate Wetting and Film Formation Conductive Polymer Ink I-A1 (Invention)

To prepare conductive polymer ink I-A1, 4.73 g conductive polymer dispersion D2 (3.17% solid by weight), 1.5 g of propylene glycol propyl ether (Aldrich Chemical Company, Inc) were mixed together with distilled water so that the final weight of the ink was 10.0 g. The final ink contained 1.5 wt % conductive polymer and 15 wt % propylene glycol propyl ether. cl Conductive Polymer Ink I-A2 (Invention)

Conductive polymer ink I-A2 was prepared similar to I-A1, except that 2.5 g of propylene glycol propyl ether was added. The final ink contained 1.5 wt % conductive polymer and 25 wt % propylene glycol propyl ether.

Conductive Polymer Ink I-A3 (Invention)

Conductive polymer ink I-A3 was prepared similar to I-A1, except that ethylene glycol monobutyl ether (Aldrich Chemical Company, Inc) was added instead of propylene glycol propyl ether. The final ink contained 1.5 wt % conductive polymer and 15 wt % ethylene glycol monobutyl ether.

Conductive Polymer Ink I-A4 (Invention)

Conductive polymer ink I-A4 was prepared similar to I-A3, except that 2.5 g of ethylene glycol monobutyl ether was added. The final ink contained 1.5 wt % conductive polymer, 25 wt % ethylene glycol monobutyl ether.

Conductive Polymer Ink I-A5 (Invention)

Conductive polymer ink I-A5 was prepared similar to I-A1, except that propylene glycol methyl ether acetate (Aldrich Chemical Company, Inc) was added instead of propylene glycol propyl ether. The final ink contained 1.5 wt % conductive polymer, 15 wt % Propylene Glycol Methyl ether Acetate.

Conductive Polymer Ink I-A6 (Invention)

Conductive polymer ink I-A6 was prepared similar to I-A4, except that additional 0.5 g of 1% Dynol 604 (Air Product and Chemicals Inc) surfactant stock solution was added. The final ink contained 1.5 wt % conductive polymer, 25 wt % ethylene glycol monobutyl ether, and 0.05 wt % of Dynol 604.

Conductive Polymer Ink I-A7 (Invention)

Conductive polymer ink I-A7 was prepared similar to I-A1, except that 0.5 g of propylene glycol butyl ether (Aldrich Chemical Company, Inc) was added instead of propylene glycol propyl ether. The final ink contained 1.5 wt % conductive polymer, 5 wt % propylene glycol butyl ether.

Conductive Polymer Ink C-A1 (Comparative Example)

Conductive polymer ink C-A1 was prepared similar to I-A2, except that isopropanol (Aldrich Chemical Company, Inc) was added instead of propylene glycol propyl ether. The final ink contained 1.5 wt % conductive polymer and 25 wt % isopropanol.

Conductive Polymer Ink C-A2 (Comparative Example)

Conductive polymer ink C-A2 was prepared similar to I-A2, except that diethylene glycol (Aldrich Chemical Company, Inc) was added instead of propylene glycol propyl ether. The final ink contained 1.5 wt % conductive polymer and 25 wt % diethylene glycol.

Conductive Polymer Ink C-A3 (Comparative Example)

Conductive polymer ink C-A3 was prepared similar to I-A1, except that 0.5 g of cyclohexanol (Aldrich Chemical Company, Inc) was added instead of propylene glycol propyl ether. The final ink contained 1.5 wt % conductive polymer and 5 wt % cyclohexanol.

Conductive Polymer Ink C-A4 (Comparative Example)

Conductive polymer ink C-A5 was prepared similar to I-A1, except that 0.17 of 1% Dynol 604 (Air Product and Chemicals Inc) surfactant stock solution and 6.78 g of conductive polymer dispersion D1 was added. The final ink contained 2.15 wt % conductive polymer and 0.017 wt % of Dynol 604.

Conductive Polymer Ink C-A5 (Comparative Example)

Conductive polymer ink C-A5 was prepared similar to I-A1, except that only water is added to dilute the dispersion. The final ink contained 1.5 wt % conductive polymer.

The three key design parameters relevant to the current invention are characterized as following:

Boiling point is the temperature at which a substance changes its state from liquid to gas. A stricter definition of boiling point is the temperature at which the liquid and vapor (gas) phases of a substance can exist in equilibrium. When heat is applied to a liquid, the temperature of the liquid rises until the vapor pressure of the liquid equals the pressure of the surrounding gases. At this point there is no further rise in temperature, and the additional heat energy supplied is absorbed as latent heat of vaporization to transform the liquid into gas. The boiling temperature of the additive at 760 mm mercury is obtained from standard physical property database.

Dynamic surface tension of the conductive ink is measured using Kruss Bubble Pressure Tensiometer BP2 which measures the dynamic surface tension of liquids using the maximum bubble pressure method. During the measurement, gas bubbles are produced in the sample liquid at an exactly defined bubble generation rate thus surface age time. The gas bubbles enter the liquid through a capillary whose radius is known. During this process the pressure passes through a maximum whose value is recorded by the instrument. For simplicity, we selected the surface tension at the surface age of 100 ms as the dynamic surface tension value for the ink.

The solubility of the additive in water is obtained from standard physical property database provided by the vendor.

For the ink performance, three key properties were examined: a) Wetting on substrate b) Film uniformity c) Ink uniformity as a solution In this invention, the wet ability of the deposit ink on the substrates (ITO/glass or ITO/plastic) are defined as "Poor" when a contact angle is 90° or greater and "Good" when the contact angel is less than 90°.

Film uniformity is carried out based on examination of the film quality which was deposited on the substrates (e.g. 1"×1" ITO/Glass supplied by Colorado Concept Coatings LLC). For the current example, spin coating method was used for all the inks. The specific spin speed was selected in order to achieve the film thickness between 50-100 nm. In addition, for samples I-A1, I-A2, I-A3, I-A5 and I-A7, roll casting (T=25° C., Rel. Humidity=42%) was also used as an alternative film deposition method. In particular, roll casting was performed by supporting a series of substrates which included untreated glass microscope slides (3"×1"), UV/ozone treated ITO/glass (1"×1"), UV/ozone treated glass/ITO (1"×1", i.e., the glass side of an ITO/glass slide), and rinsed and dried ITO/PET (2"×1")—on a vacuum plate, applying a small quantity of filtered, formulated material onto each and rolling a 0.8 mil wire-wound rod (#8, stainless steel, Paul N. Gardner Co.).

A simple ranking system is developed to evaluate the film uniformity: "Good" when a uniform coating layer covers >80% of the surface area without major visible defects such as comic/star spots; "Fair" when a uniform coating layer covers between 60-80% of the surface area, some visible defects can be detected; "Poor" when the coverage is less than 60% of the substrate with major visible defects. In order to differentiate the performance difference, the ITO/Glass substrate used in this example is not surface treated by O3/UV or plasma.

Ink solution uniformity is an evaluation of the compatibility of the additive with the conductive polymer dispersion solution. When the amount of additive added to the solution exceeds its solubility in the carrier media (in this case water), phase separation can be observed. Depending on the density difference, distinct layers between the solvent and carrier can be seen. This is indicated as "Poor" for ink solution uniformity. Otherwise, the ink solution uniformity is considered "Good".

TABLE A

Additive design parameters and ink/film properties for Example A

| Conductive polymer ink | Dynamic | | | | Ink/Film Properties | | |
|---|---|---|---|---|---|---|---|
| | wt % Additive in ink | Surface Tension (dynes/cm) | Additive Boiling T (deg C.) | Additive solubility limit | Wettability on Substrate | Film uniformity | Ink Solution Uniformity |
| I-A1 | 15% | 38 | 149 | 100% | Good | Good | Good |
| I-A2 | 25% | 38 | 149 | 100% | Good | Good | Good |
| I-A3 | 15% | 40 | 171 | 100% | Good | Good | Good |
| I-A4 | 25% | 41 | 171 | 100% | Good | Good | Good |
| I-A5 | 15% | 44 | 209 | 16% | Good | Good | Good |
| I-A6 | 25% | 41 | 171 | 100% | Good | Good | Good |
| I-A7 | 5% | 31 | 171 | 5.5% | Good | Good | Good |
| C-A1 | 25% | 37 | 82.4 | 100% | Good | Fair | Good |
| C-A2 | 25% | 64 | 244 | 100% | Poor | Poor | Good |
| C-A3 | 5% | 37 | 161 | 4% | N/A | N/A | Poor |
| C-A4 | 0.02% | 72 | >250 | >0.1% | Poor | Poor | Good |
| C-A5 | 25% | 72 | 100 | 100% | Poor | Poor | Good |

The data in Table A clearly demonstrated that inks made to satisfy the design parameters showed a combination of advantages including good wetting on substrate, uniform films after the inks were deposited on the substrate and good ink solution uniformity. However, any deviation from the design range can result in adverse effects within one or more of the properties under investigation.

Example B

Conductive Polymer Dispersion Inks with Both Device Performance and Processability Advantages

Conductive Polymer Ink I-B1 (Invention)

To prepare conductive polymer ink I-B1, 7.34 g conductive polymer dispersion D1 (2.86% solid by weight), 2.5 g of propylene glycol propyl ether (Aldrich Chemical Company, Inc) were mixed together with distilled water so that the final weight of the ink was 10.0 g. The final ink contained 2.15 wt % conductive polymer and 25 wt % propylene glycol propyl ether.

Conductive Polymer Ink I-B2 (Invention)

Conductive polymer ink I-B2 was prepared similar to I-B1, except ethylene glycol butyl ether (Aldrich Chemical Company, Inc) was added instead of propylene glycol propyl ether. The final ink contained 2.15 wt % conductive polymer and 25 wt % ethylene glycol butyl ether.

Conductive Polymer Ink C-B1 (Comparative)

Conductive polymer ink C-B1 is the same as the conductive polymer dispersion D3.

Conductive Polymer Ink C-B2 (Comparative)

Conductive polymer ink C-B2 is the commercial available conductive polymer Baytron CH8000 (a PEDOT/PSSA dispersion) which is available from H. C Starks.

Conductive Polymer Ink C-B3 (Comparative)

Conductive polymer ink C-B3 is the same as the conductive polymer dispersion D1.

Conductive Polymer Ink C-B4 (Comparative)

To prepare conductive polymer ink C-B4, 7.5 g conductive polymer dispersion D3 (2.36% solid by weight), 2.5 g of propylene glycol propyl ether (Aldrich Chemical Company, Inc) were mixed together with distilled water so that the final weight of the ink was 10.0 g. The final ink contained 1.77 wt % conductive polymer and 25 wt % propylene glycol propyl ether.

Evaluation similar to example A was conducted using the inventive inks I-B1 and I-B2. As shown in Table B, both inks satisfy the three additive design parameters and showed good ink and film properties.

Furthermore, additional evaluations were carried out for example B. They are summarized as below.

Viscosity of the ink was measured using an ARES controlled-strain rheometer (TA Instruments, New Castle, Del., formerly Rheometric Scientific). Temperature was controlled at 25° C. using a circulating water bath. The atmosphere was saturated with water vapor to minimize water evaporation during testing. A Couette geometry was used; both bob and cup were constructed out of titanium. The bob was 32 mm in diameter and 33.3 mm in length; the diameter of the cup was 34 mm. Approximately 10 ml of sample was used per experiment. After sample loading, the sample was subjected to a 5 min preshear at 100 s-1 for removing the effects of loading history. After a 15 minute delay, viscosities were measured at shear rates ranging from 1 to 200 $s^{-1}$.

In addition to substrate wettability as illustrated in Example A, the ability to form adjustable film thickness during deposition stage is also an essential parameter for optimal device performance. Based on basic device physics, the film thickness of a conductive polymer layer in the device can greatly affect device performance including power efficiency and lifetime. Therefore, optimal film thickness control is one of the performance attributes demonstrated in this invention. The desirable film thickness for the hole injection layer in light emitting device is between 60-100 nm. In addition, when using a spin coater to deposit film on substrate, it is desirable to have the spin speed greater than 1000 rpm for better film formation. Therefore, when the film has a thickness of more than 60nm at the spin speed range of 1000 to 3000 rpm, we determine it to be "good" for film thickness control thus good processibility with tunable film formation. Similarly, when the film has a thickness of less than 60 nm at the spin speed range of 1000 to 3000 rpm, we determine it to be "poor" for film thickness control, thus poor processibility for film formation. It is understood that for deposition methods other than spin coating (such as gravure coating, slit coating, flexo coating, etc.), similar criteria for film thickness control can be determined. All the film thicknesses were measured on a KLA Tencor P-15 Profiler.

Device fabrication and testing were carried out as follows: the light emitting devices were fabricated on patterned indium tin oxide coated glass substrate of 10-1512 Ω/square (from Colorado Concept Coatings LLC). The ITO substrates were cleaned by a combination of de-ionized water, detergent, methanol and acetone. Then the ITO substrate was treated with oxygen plasma in an SPI Prep II plasma etcher for about 10 min. After that, the ITO substrate was spin coated with conductive polymer inks at selected spin speed in order to obtain a film thickness of around 70-100 nm. The spin length is programmed to be 1 min on a Laurell Model WS-400-N6PP spinner. All conductive poymer inks were filtered with a 0.45 micron PVDF filter before spin coating. A uniform film of was obtained. The ITO substrates were then annealed at 180 to 200° C. for 15 min. After the annealing, a layer of about 80-nm-thick green light emitting polymer was spin coated from toluene solution. The samples were then baked at 130° C. for 20 min on a hotplate under $N_2$ protection. The samples were then transferred into the chamber of a vacuum evaporator, which was located inside an argon atmosphere glove box. A layer of Ba was vacuum deposited followed by a layer of Ag. The devices were then encapsulated with glass cover lid and UV curable epoxy in the argon glove box. The active area of the device was about 6.2 $mm^2$. The LED device was then moved out of the glove box for testing in air at room temperature. Thickness was measured on a KLA Tencor P-15 Profiler. Current-voltage characteristics were measured on a Keithley 2400 SourceMeter. Electroluminescence (EL) spectrum of the device was measured using an Oriel InstaSpec IV CCD camera and is illustrated in FIG. 3 in U.S Patent Applications US20060076557 A1, which is hereby incorporated by reference in its entirety. The power of EL emission was measured using a Newport 2835-C multi-function optical meter in conjunction with a calibrated Si photodiode. Brightness was calculated using the EL forward output power and the EL spectrum of the device, assuming Lambertian distribution of the EL emission, and verified with a Photo Research PR650 calorimeter. The lifetime of PLED devices was measured on an Elipse™ PLED Lifetime Tester (from Cambridge Display Technology) under constant current driving condition at room temperature. The driving current was set according to the current density needed to achieve the initial brightness measured using the Si photodiode. For this set of experiments, we selected 5000nits as the initial device brightness and defined the life time of the device as the time takes for the brightness to reach 50% of the initial value. Since multiple devices were made using the same ink composition, the maximum current efficiency from IVB measurement and the life time of the device from lifetime tester were reported as a range in Table C.

TABLE B

Additive design parameters and ink/film properties for Example B

| Conductive polymer ink | Additive Design Parameters | | | | Ink/Film Properties | | |
|---|---|---|---|---|---|---|---|
| | Dynamic | | | | | | |
| | wt % Additive in ink | Surface Tension (dynes/cm) | Additive Boiling T (deg C.) | Additive solubility limit | Wettability on Substrate | Film uniformity | Ink Solution Uniformity |
| I-B1 | 25% | 38 | 149 | 100% | Good | Good | Good |
| I-B2 | 25% | 41 | 171 | 100% | Good | Good | Good |

TABLE C

Conductive polymer ink processibility and device performance for Example

| Conductive Polymer Inks | Viscosity mPa·s | Film thickness | | | Tunable Film formation | Life time (hrs) | Max. Current Efficiency (Cd/A) |
|---|---|---|---|---|---|---|---|
| | | 1000 rpm | 2000 rpm | 3000 rpm | | | |
| I-B1 | 11.8 | 92 nm | 66 nm | | Yes | 450-500 | 10.9-11.3 |
| I-B2 | 12.0 | 97 nm | 70 nm | | Yes | 450-500 | 10.4-11.2 |
| C-B1 | 4.2 | 109 nm | 74 nm | 62 nm | Yes | 20-50 | 8.7-9.3 |
| C-B2 | 9.0 | 175 nm | 136 nm | 120 nm | Yes | 20-50 | 8.3-8.5 |
| C-B3 | 2.1 | 60 nm | 34 nm | | No | 450-500 | 11.0-11.3 |
| C-B4 | 15.0 | 120 nm | 80 nm | 64 nm | Yes | 50 | 10-10.5 |

The data in Table C clearly demonstrated that the inks in this invention showed significantly improved control of film thickness during film formation process as compared to the pure conductive polymer dispersion ink (C-B3). Previously, this feature was only achievable by selecting conductive polymer inks comprising non-fluorinated colloid-forming dispersing groups(C-B2, C-B3 and C-B4). More importantly, inks in this invention maintained the superb device performance which were achieved through the incorporation of fluorinated colloid-forming dispersing group in the conductive polymers. The devices using conductive polymer inks I-B1 and I-B2 showed significantly longer lifetime and better maximum current efficiency as compared with the devices made by using condutive polymers without the fluorinated colloid-forming dispersing group (e.g. PSSA) as the hole injection layer (C-B1, C-B2 and C-B4).

While the invention has been described with reference to certain aspects or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An aqueous dispersion comprising:
   water;
   at least one fluorinated dispersant;
   at least one electrically conductive polymer; and
   at least one film forming additive comprising at least one ether,
   wherein the at least one ether comprises at least one compound selected from the group consisting of diethylene glycol mono-methyl ether, mono-ethyl ether, mono-propyl ether, or mono-butyl ether; propylene glycol propyl ether or butyl ether; triethylene glycol mono-methyl ether, mono-ethyl ether, or mono-butyl ether; diethylene glycol di-methyl ether or di-ethyl ether; poly(ethylene glycol) monobutyl ether; diethylene glycol monobutyl ether; propylene glycol methyl ether acetate; and combinations thereof; and the amount of film forming additive is at least 80% of the maximum solubility limit of the additive in the water.

2. The dispersion of claim 1, wherein the dispersant comprises at least one copolymer having a formula:

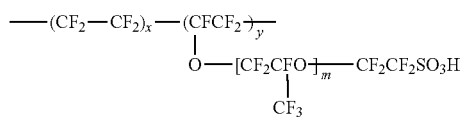

wherein m=1.

3. The dispersion of claim 1, wherein the conductive polymer comprises a polymer selected from the group consisting of polyaniline, polypyrroles, polythiophene, derivatives of polyaniline, polypyrroles, polythienothiophene and combinations thereof.

4. The dispersion of claim 3, wherein said polypyrrole has Formula I:

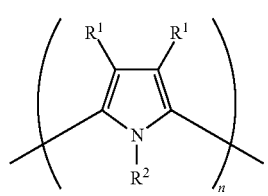

or said polythiophene has Formula II:

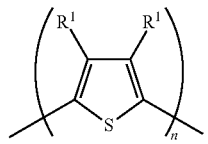

where in Formula I and Formula II: $R^1$ is independently selected so as to be the same or different at each occurrence and is selected from the group consisting of hydrogen, alkyl, alkenyl, alkoxy, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, amidosulfonate, benzyl, carboxylate, ether, ether carboxylate, ether sulfonate, and urethane; or both $R^1$ groups together may form an alkylene or alkenylene chain completing a 3, 4, 5, 6, or 7-membered aromatic or alicyclic ring, which ring may optionally include one or more atoms selected from the group consisting of divalent nitrogen, sulfur and oxygen atoms; and n is at least 4; where in Formula I: $R^2$ is independently selected so as to be the same or different at each occurrence and is selected from the group consisting of hydrogen, alkyl, alkenyl, aryl, alkanoyl, alkylthioalkyl, alkylaryl, arylalkyl, amino, epoxy, silane, siloxane, alcohol, amidosulfonate, benzyl, carboxylate, ether, ether carboxylate, ether sulfonate, sulfonate, and urethane.

5. The composition according to claim 4, wherein the polymer is a polypyrrole having Formula I and $R^1$ and $R^2$ are hydrogen.

6. The composition according to claim 4, wherein both $R^1$ together form a 6-or 7-membered alicyclic ring, which is further substituted with a group selected from the group consisting of alkyl, heteroalkyl, alcohol, amidosulfonate, benzyl, carboxylate, ether, ether carboxylate, ether sulfonate, sulfonate, and urethane.

7. The composition according to claim 3, wherein the polymer is a polythiophene having Formula II and $R^1$ together form —O—$(CHY)_m$—O—, where m is 2 or 3, and Y is the same or different at each occurrence and is selected from hydrogen, alkyl, alcohol, amidosulfonate, benzyl, carboxylate, ether, ether carboxylate, ether sulfonate, sulfonate, and urethane.

8. The composition according to claim 3, wherein the polymer is at least one member selected from the group consisting of:

a compound containing a repeating unit having formula:

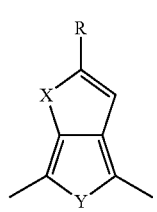

X is S or Se, Y is S or Se, and R is a substituent group; and

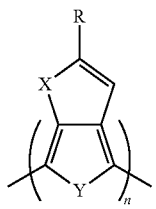

wherein X is S or Se, Y is S or Se, R is a substituent group and n is an integer greater than about 2 and less than 20.

9. The dispersion of claim 8, wherein R comprises a member selected from the group consisting of hydrogen, isotopes of hydrogen, hydroxyl, alkyl, arylalkyl, alkenyl, perfluoroalkyl, perfluororaryl, aryl, alkoxy, cycloalkyl, cycloalkenyl, alkanoyl, alkylthio, aryloxy, alkylthioalkyl, alkynyl, alkylaryl, arylalkyl, amido, alkylsulfinyl, alkoxyalkyl, alkylsulfonyl, aryl, arylamino, diarylamino, alkylamino, dialkylamino, arylarylamino, arylthio, heteroaryl, arylsulfinyl, alkoxycarbonyl, arylsulfonyl, carboxyl, halogen, nitro, cyano, sulfonic acid, and alkyl and phenyl substituted with one or more sulfonic acid, sulfonic acid derivative, phosphoric acid, phosphoric acid derivative, carboxylic acid, carboxylic acid derivative, halo, amino, nitro, hydroxyl, cyano, epoxy moieties and combinations thereof.

10. The dispersion of claim 8, wherein R comprises a member selected from the group consisting of hydrogen, alkylaryl, arylalkyl, aryl, heteroaryl, $C_1$ to $C_{12}$ primary, secondary or tertiary alkyl groups, which may be mono- or polysubstituted by F, Cl, Br, I or CN, and wherein one or more non-adjacent CH2 groups may be replaced, independently with —O—, —S—, —NH—, —NR'—, —SiR'R"—, —CO—, —COO—, —OCO—, —OCO—O—, —S—CO—, —CO—S—, —CH=CH— or —C≡C— in such a manner that O and/or S atoms are not linked directly to one another, phenyl and substituted phenyl groups, cyclohexyl, naphthalenic, hydroxyl, alkyl ether, perfluoroalkyl, perfluoroaryl, carboxylic acids, esters and sulfonic acid groups, perfluoro, $SF_5$, F and combinations thereof, wherein R' and R" are independently of each other H, aryl or alkyl with 1 to 12 C atoms.

11. The dispersion of claim 1, wherein the film forming additive comprises at least one member selected from the group consisting of an alcohol, a polyhydric alcohol, a lower mono- and di-alkyl ether derived polyhydric alcohol, a nitrogen-containing compound, a sulfur-containing compound, a ketone, an ether, an ester, a surfactant and combinations thereof.

12. The dispersion of claim 11, wherein the film forming additive comprises at least one compound selected from the group consisting of methyl alcohol, ethyl alcohol, n-propyl alcohol, isopropyl alcohol, n-butyl alcohol, sec-butyl alcohol, t-butyl alcohol, iso-butyl alcohol, furfuryl alcohol, tetrahydrofurfuryl alcohol and combinations thereof.

13. The dispersion of claim 11, wherein the film forming additive comprises at least one compound selected from the group consisting of ethylene glycol, diethylene glycol(DEG), triethylene glycol, propylene glycol, tetraethylene glycol, polyethylene glycol, glycerol, 2-methyl-2,4-pentanediol, 2-ethyl-2-hydroxymethyl-1,3-propanediol(EHMP), 1,5 pentanediol, 1,2-hexanediol, 1,2,6-hexanetriol, thioglycol and combinations thereof.

14. The dispersion of claim 11, wherein the film forming additive comprises at least one compound selected from the group consisting of 2-pyrrolidone, N-methyl-2-pyrrolidone, 1,3-dimethyl-2-imidazolidinone, 2,2'-thiodiethanol, dimethyl sulfoxide, tetramethylene sulfone and combinations thereof.

15. The dispersion of claim 1, wherein the dispersion further comprises at least one compound selected from the group consisting of anionic surfactant, cationic surfactant, amphoteric surfactant, nonionic surfactant and combinations thereof.

16. The dispersion of claim 1 wherein the film forming additive has a boiling temperature greater than about 85° C.

17. The dispersion of claim 1 wherein the dispersion has a dynamic surface tension at 100 ms surface age is less than about 60 dynes/cm.

18. The dispersion of claim 1 wherein the ether comprises propylene glycol propyl ether.

19. The dispersion of claim 1 wherein the ether comprises propylene glycol methyl ether acetate.

20. The dispersion of claim 1 wherein the ether comprises propylene glycol butyl ether.

21. The dispersion of claim 1 wherein the amount of ether is at least 15 wt. % of the dispersions.

22. The dispersion of claim 1 wherein the amount of film forming additive is at least 95% of the maximum solubility limit of the additive in the water.

23. The dispersion of claim 1 further comprising at least one surfactant.

24. The dispersion of claim 3 wherein the conductive polymer comprises polythienothiophene.

25. The dispersion of claim 1 wherein the conductive polymer comprises polythienothiophene.

26. The dispersion of claim 22 wherein the conductive polymer comprises polythienothiophene.

* * * * *